United States Patent
Fuji et al.

(10) Patent No.: US 10,801,908 B2
(45) Date of Patent: Oct. 13, 2020

(54) DIAPHRAGM SUPPRESSING PRESSURE SENSOR

(71) Applicant: NGK SPARK PLUG CO., LTD., Nagoya-shi, Aichi (JP)

(72) Inventors: Yusuke Fuji, Nagoya (JP); Tatsunori Yamada, Seto (JP); Daiki Goto, Nagoya (JP); Junki Iwabuchi, Niwa-gun (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 210 days.

(21) Appl. No.: 16/086,105

(22) PCT Filed: Dec. 8, 2016

(86) PCT No.: PCT/JP2016/086529
§ 371 (c)(1),
(2) Date: Sep. 18, 2018

(87) PCT Pub. No.: WO2018/012007
PCT Pub. Date: Jan. 18, 2018

(65) Prior Publication Data
US 2020/0200636 A1   Jun. 25, 2020

(30) Foreign Application Priority Data
Jul. 9, 2016   (JP) .................................. 2016-136467

(51) Int. Cl.
*G01L 7/08* (2006.01)
*G01L 23/10* (2006.01)
(Continued)

(52) U.S. Cl.
CPC .............. *G01L 23/10* (2013.01); *G01L 9/008* (2013.01); *G01L 9/0047* (2013.01);
(Continued)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS

| 4,093,933 A * | 6/1978 | Wilner .................. G01L 9/0055 338/42 |
| 2003/0072127 A1 * | 4/2003 | Zias ........................ G01L 1/148 361/311 |
| 2013/0068030 A1 | 3/2013 | Friedl et al. |

FOREIGN PATENT DOCUMENTS

JP    2009-186209 A    8/2009

OTHER PUBLICATIONS

International Search Report for PCT/JP2016/086529 dated Jan. 17, 2017.

* cited by examiner

*Primary Examiner* — Andre J Allen
(74) *Attorney, Agent, or Firm* — Sughrue Mion, PLLC

(57) ABSTRACT

A pressure sensor including: a cylindrical casing extending in an axial direction; a diaphragm joined to the distal end side of the casing, extending in a direction intersecting the axis of the casing and deforming in accordance with pressure received on the distal end side; and a sensor section disposed inside the casing and outputting an electric signal corresponding to the deformation of the diaphragm. The diaphragm is provided with a plate-shaped base part and three or more protruding parts protruding from the distal end side surface of the base part toward the distal end side and set apart from each other. The relationships $0.05 \leq H \leq 2.5T$ and $0.05 \leq (S2/S1) \leq 0.8$ are satisfied, where T (thickness), H (length), S1 (area of base distal end surface) and S2 (total area of protruding distal end surfaces) are as defined herein.

8 Claims, 8 Drawing Sheets

(51) Int. Cl.
*G01L 19/06* (2006.01)
*G01L 9/00* (2006.01)
*G01L 23/22* (2006.01)
*G01L 19/14* (2006.01)

(52) U.S. Cl.
CPC .......... *G01L 19/0681* (2013.01); *G01L 19/14* (2013.01); *G01L 23/22* (2013.01)

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC .................................................. 73/700–756
See application file for complete search history.

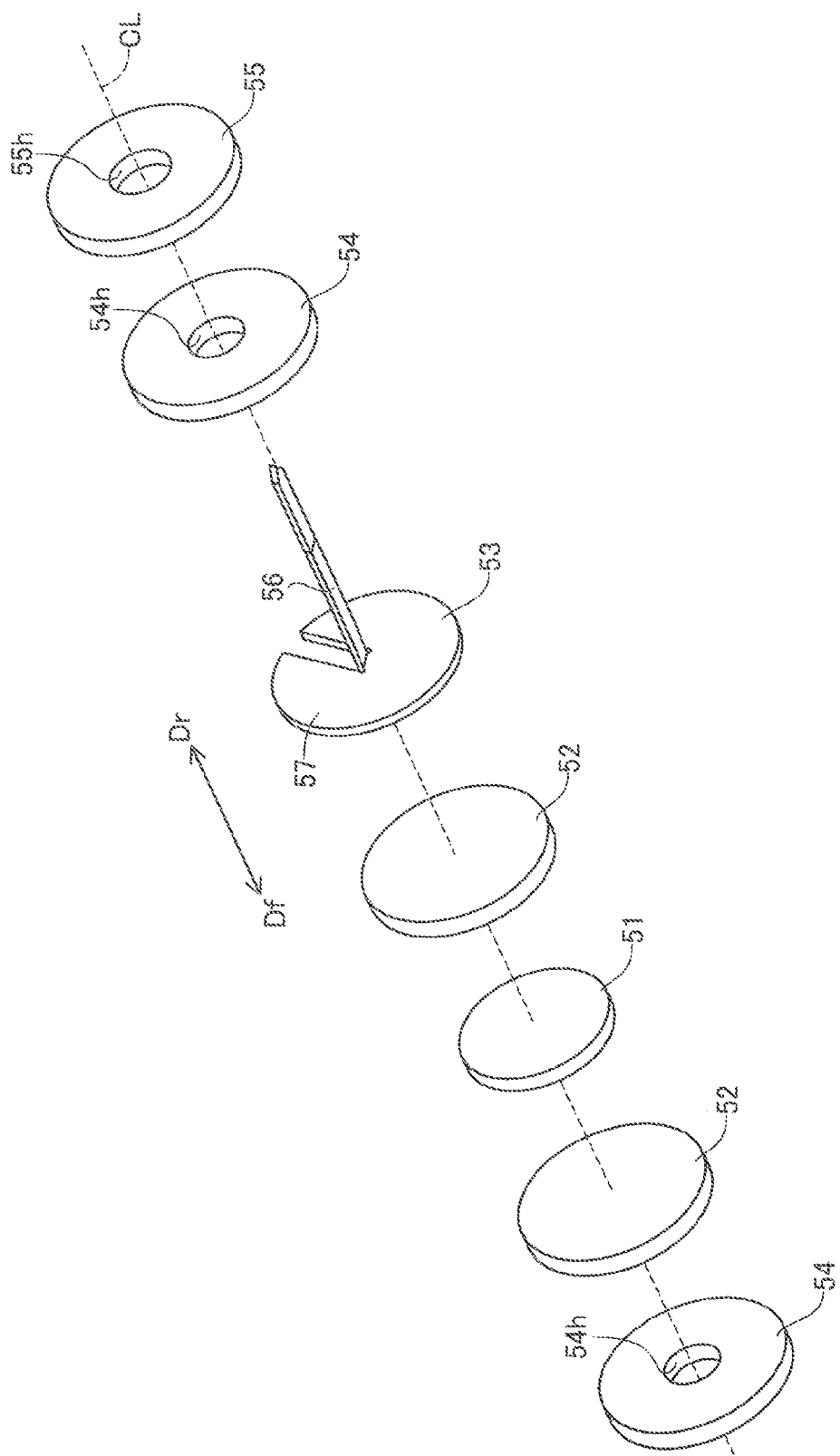

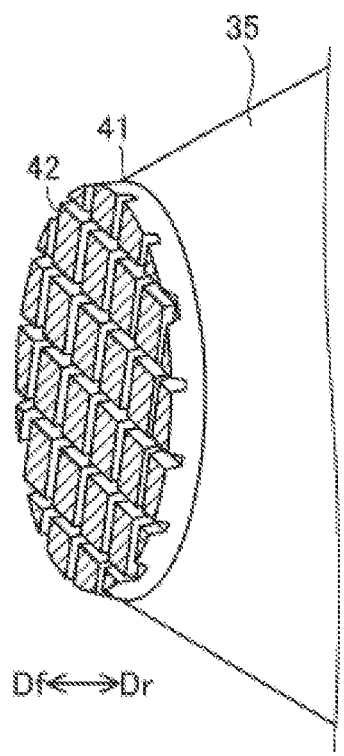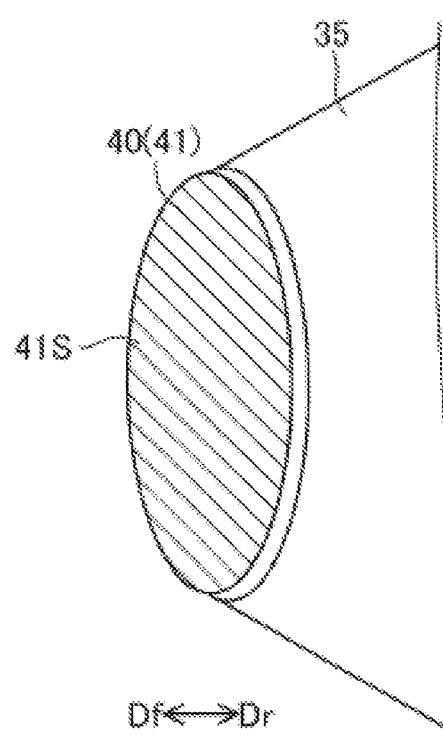

DIAPHRAGM SUPPRESSING PRESSURE SENSOR

CROSS REFERENCE TO RELATED APPLICATIONS

This application is a National Stage of International Application No. PCT/JP2016/086529, filed Dec. 8, 2016, claiming priority based on Japanese Patent Application No. 2016-136467, filed Jul. 9, 2016.

TECHNICAL FIELD

The present description relates to a pressure sensor for measuring the pressure inside a combustion chamber of an internal combustion engine.

BACKGROUND TECHNOLOGY

A pressure sensor has been known which measures the pressure inside a combustion chamber of an internal combustion engine by outputting an electric signal in accordance with the deformation of a diaphragm. For example, in a pressure sensor described in a patent document 1, a technique has been disclosed in which the thermal expansion coefficient of a member forming the inner layer of a diaphragm is made larger than the thermal expansion coefficient of a member forming the outer layer thereof. With this, the deformation of the diaphragm caused by heat can be suppressed, and the measuring accuracy of the pressure can be improved.

PRIOR ART REFERENCE

Patent Document

Patent Document 1: Japanese Patent Application Publication 2009-186209

SUMMARY OF THE INVENTION

Task to be Solved by the Invention

In this way, in the pressure sensor used under high temperatures, it has been required to improve the measuring accuracy of the pressure by suppressing the deformation of the diaphragm caused by the heat.

In a pressure sensor, the present description discloses a new technique which is capable of improving the measuring accuracy of pressure.

Means for Solving the Task

The technique disclosed in the present description can be realized, for example, as the following application example.

APPLICATION EXAMPLE 1

A pressure sensor includes:
a cylindrical casing extending in an axial direction;
a diaphragm which is joined to a distal end side of the casing, expands in a direction that intersects an axis of the casing, and which is deformed in accordance with a pressure received on the distal end side; and
a sensor section which is disposed inside the casing and which outputs an electric signal that corresponds to the deformation of the diaphragm,
wherein the diaphragm includes a plate-shaped base part and three or more protruding parts which protrude from a surface on the distal end side of the base part toward the distal end side and which are set apart from each other, and
wherein relationships $0.05T \leq H \leq 2.5T$ and $0.05 \leq (S2/S1) \leq 0.8$ are satisfied, when T is a thickness of the base part, H is a length in the axial direction of the protruding parts, S1 is an area of a base distal end surface that would be the surface on the distal end side of the base part if the protruding parts were not present, and S2 is a total area of protruding distal end surfaces that are surfaces on the distal end side of the three or more protruding parts.

According to the above configuration, when the diaphragm receives heat, by the three or more protruding parts, the deformation of the diaphragm can be suppressed. Consequently, the measuring accuracy of the pressure by the pressure sensor can be improved.

APPLICATION EXAMPLE 2

The pressure sensor according to the application example 1 is characterized in that four or more of the protruding parts are provided, and
when two virtual planes are defined as a pair of the virtual planes, the two virtual planes which include the axis, pass through a gravity center of the base distal end surface, are perpendicular to each other, and which divide the base distal end surface into four areas, at least one pair of the virtual planes which divides the base distal end surface such that one or more of the protruding parts are positioned in each of the four areas are present.

According to the above configuration, when the diaphragm receives heat, the deformation of the diaphragm can be suppressed more effectively.

APPLICATION EXAMPLE 3

The pressure sensor according to the application example 1 or 2 is characterized in that the three or more protruding parts include a protruding part of which a corresponding one of the protruding distal end surfaces has a polygonal shape.

APPLICATION EXAMPLE 4

The pressure sensor according to any of the application examples 1 to 3 is characterized in that the diaphragm includes a plurality of grooves each having a depth H, which extend along the surface on the distal end side, and
the three or more protruding parts are set apart from each other by the grooves.

According to the above configuration, it is possible to form the protruding parts each having a structure which is capable of effectively suppressing the deformation of the diaphragm caused by heat, and which can be easily manufactured.

APPLICATION EXAMPLE 5

The pressure sensor according to the application example 4 is characterized in that the plurality of the grooves include a plurality of first grooves arranged parallel to each other and a plurality of second grooves arranged parallel to each other and intersecting the first grooves.

According to the above configuration, it is possible to form the protruding parts each having a structure which is capable of suppressing the deformation of the diaphragm caused by heat more effectively, and which is easily manufactured.

APPLICATION EXAMPLE 6

The pressure sensor according to the application example 5 is characterized in that the three or more protruding parts are separated from other protruding parts by two of the first grooves and two of the second grooves, and include the protruding part of which a corresponding one of the protruding distal end surfaces has a square shape.

APPLICATION EXAMPLE 7

The pressure sensor according to the application example 6 is characterized in that the plurality of the grooves including the first grooves and the second grooves are arranged in a lattice shape.

According to the above configuration, it is possible to form the protruding parts each having a structure which is capable of suppressing the deformation of the diaphragm caused by heat further effectively, and which is easily manufactured.

APPLICATION EXAMPLE 8

The pressure sensor according to any of the application examples 1 to 7 characterized in that, in a cross section including the axis, an acute angle θ formed between a surface on a rear end side of the base part and a direction perpendicular to the axis is 20 degrees or less.

In addition, the technique disclosed in the present description can be realized in a variety of aspects. For example, it can be realized in aspects of a pressure sensor, an internal combustion engine on which its pressure sensor is mounted, etc.

FIG. 3 is a perspective exploded view of an element section 50.

FIGS. 5A and 5B is are second explanatory views of the diaphragm 40.

MODE FOR IMPLEMENTING THE INVENTION

A. First Embodiment

A-1. Configuration of Pressure Sensor 10

Figure 1:
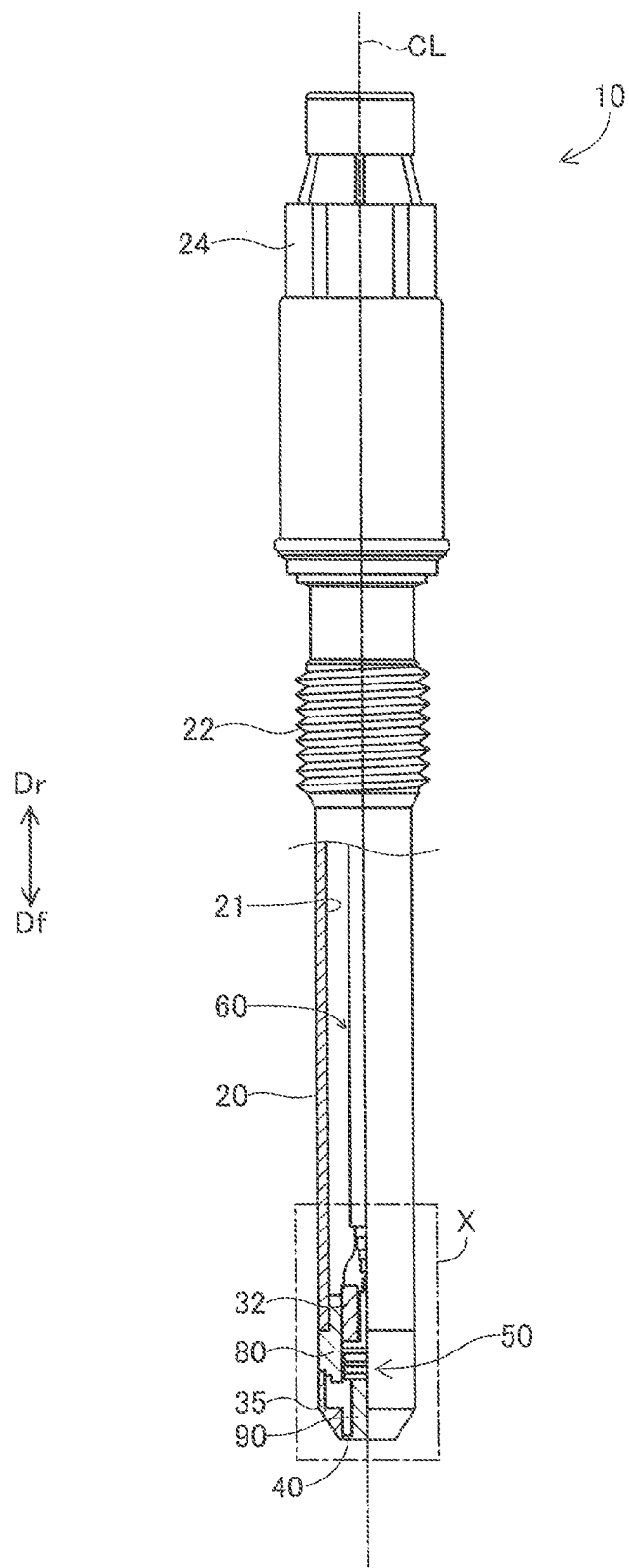
FIG. 1 is an explanatory view showing a pressure sensor 10 as a first embodiment.

FIG. 1 is an explanatory view showing a pressure sensor 10 as a first embodiment. The pressure sensor 10 of the present embodiment is attached to an internal combustion engine, and is used for detecting the pressure of the inside of a combustion chamber of the internal combustion engine. As shown in FIG. 1, the pressure sensor 10 is provided with, as main components, a cylindrical first metal fitting 20, second metal fitting 80 and third metal fitting 35, a diaphragm 40, a transmission rod 90, an element section 50 and a cable 60. An axis CL is the central axis of the pressure sensor 10. Hereinafter, the direction parallel to the axis CL is also referred to as "axial direction". The radial direction of a circle with the axis CL as a center is also simply referred to as "radial direction", and the circumferential direction of a circle with the axis CL as a center is also simply referred to as "circumferential direction". In addition, the direction toward the diaphragm 40 from the first metal fitting 20 along the axis CL is referred to as "distal end direction Df", and the direction opposite to the distal end direction Df is referred to as "rear end direction Dr". The distal end direction Df side is also referred to as "distal end side", and the rear end direction Dr side is also referred to as "rear end side".

In FIG. 1, a cross sectional configuration of a part on the distal end side of the pressure sensor 10 on the left side from the axis CL is shown. This cross section is a plane cross section (the cross section that is cut at a plane) including the axis CL. In addition, in FIG. 1, the appearance configurations of other parts of the pressure sensor 10 are shown. In the present embodiment, the axis CL of the pressure sensor 10 corresponds to the axis of each of the first metal fitting 20, the second metal fitting 80, the third metal fitting 35, the transmission rod 90, the diaphragm 40 and the element section 50.

The first metal fitting 20, the second metal fitting 80 and the third metal fitting 35 have ring shapes in section (hereinafter, also referred to as a cross section) perpendicular to the axis CL, and have cylindrical shapes extending in the axial direction. In the present embodiment, the first metal fitting 20, the second metal fitting 80 and the third metal fitting 35 are each made of stainless steel, and for joining these metal fittings, for example, laser welding is used. However, other materials (for example, steel such as low carbon steel, and various metal materials) and other joining methods (for example, resistance welding and press-fitting) can be adopted. The first metal fitting 20, the second metal fitting 80 and the third metal fitting 35 are joined, and form a casing of the pressure sensor 10.

The first metal fitting 20 is formed with a shaft hole 21 that is a through-hole with the axis CL as a center. In addition, the outer circumferential surface on the rear end side of the first metal fitting 20 is provided with a screw part 22 and a tool engaging part 24. The screw part 22 is formed with a thread groove used for fixing the pressure sensor 10 to a cylinder head of the internal combustion engine. The tool engaging part 24 has an outer circumferential shape (for example, a hexagon in cross section) which engages with a tool (not shown in the drawings) used for the attachment and detachment of the pressure sensor 10.

Figure 2:
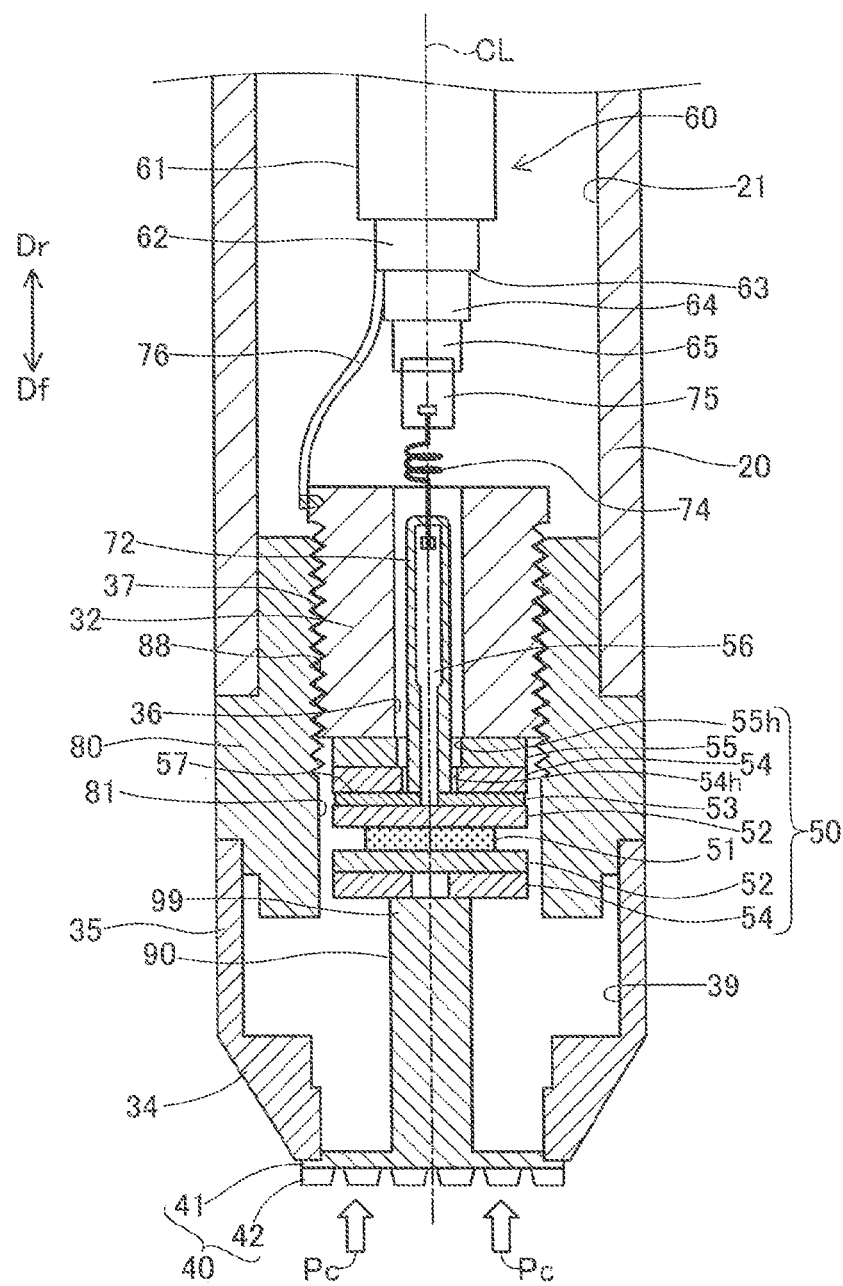
FIG. 2 is an enlarged sectional view showing the distal end portion of the pressure sensor 10.

FIG. 2 is an enlarged sectional view showing the distal end portion of the pressure sensor 10, specifically a part shown as an area X in FIG. 1. This section is a plane cross section including the axis CL. The second metal fitting 80 is positioned on the distal end side of the first metal fitting 20, and is joined to the distal end of the first metal fitting 20. The third metal fitting 35 is positioned on the distal end side of the second metal fitting 80, and is joined to the second metal fitting 80. The distal end side of the third metal fitting 35 is formed with an enlarged diameter portion 34 whose diameter is enlarged from the distal end side toward the rear end side. In case where the pressure sensor 10 is attached to the internal combustion engine, the enlarged diameter portion 34 comes in tight contact with the cylinder head of the internal combustion engine.

The second metal fitting 80 is formed with a shaft hole 81 that is a through-hole with the axis CL as a center. The third metal fitting 35 is formed with a shaft hole 39 that is a through-hole with the axis CL as a center. The shaft hole 21 of the first metal fitting 20, the shaft hole 81 of the second metal fitting 80 and the shaft hole 39 of the third metal fitting 35 form a continuous through-hole communicating to the shaft hole 21 of the first metal fitting 20. The inside of the shaft hole 81 of the second metal fitting 80 is disposed with the element section 50 and a press screw 32 arranged in this order from the distal end side toward the rear end side. The inside of the shaft hole 39 of the third metal fitting 35 is disposed with the transmission rod 90.

The diaphragm 40 is a substantially disc-shaped film expanding in a direction that intersects the axis CL (that is, the radial direction). The outer circumferential edge of the diaphragm 40 is joined to the distal end portion of the third metal fitting 35 by a predetermined joining method (for example, laser welding) over the entire circumference. In this way, in the distal end side of the third metal fitting 35, the diaphragm 40 closes the shaft hole 39. The detail of the diaphragm 40 will be explained below.

The transmission rod 90 is connected to the middle portion of the surface on the rear end side of the diaphragm 40. The transmission rod 90 has a columnar shape with the axis CL as a center, and extends from the diaphragm 40 toward the rear end direction Dr side. A rear end portion 99 of the transmission rod 90 is connected to the element section 50. The diaphragm 40 and the transmission rod 90 are formed integrally with each other (for example, by casting and machine cutting) by using stainless steel. It can be possible that the diaphragm 40 and the transmission rod 90 are formed separately and they are joined together by welding. The diaphragm 40 and the transmission rod 90 may be formed by using other materials (for example, steel such as low carbon steel, and various metal materials).

The press screw 32 is attached to the rear end side of the shaft hole 81 of the second metal fitting 80. The press screw 32 is formed with a shaft hole 36 that is a through-hole with the axis CL as a center. The outer circumferential surface of the press screw 32 is formed with an external thread 37. The inner circumferential surface of the rear end side part of the shaft hole 81 of the second metal fitting 80 is formed with an internal thread 88 corresponding to the external thread 37 of the press screw 32. The press screw 32 is screwed into the shaft hole 81 from the rear end side of the second metal fitting 80. The element section 50 is sandwiched between the press screw 32 and the transmission rod 90. The press screw 32 applies a preload to the element section 50. By adjusting the number of the rotation of the press screw 32 when the press screw 32 is screwed into the second metal fitting 80, the application of an appropriate preload can be easily performed. Consequently, the measuring accuracy of pressure can be improved. In addition, the press screw 32 is made of stainless steel. However, other materials (for example, steel such as low carbon steel, and various metal materials) may be adopted.

The element section 50 is provided with two electrodes 52, a piezoelectric element 51 sandwiched between the two electrodes 52, a press plate 54 disposed on the distal end side of the electrode 52 arranged on the distal end side, and with a lead part 53, a press plate 54 and an insulation plate 55 arranged in this order from the electrode 52 arranged on the rear end side toward the rear end direction Dr. As shown in FIG. 2, the press plate 54, the electrode 52, the piezoelectric element 51, the electrode 52, the lead part 53, the press plate 54 and the insulation plate 55 are laminated in this order from the distal end side toward the rear end side. The surface on the rear end side of the insulation plate 55 is supported on the surface on the distal end side of the press screw 32.

The rear end portion 99 of the transmission rod 90 comes in contact with the surface on the distal end side of the press plate 54 on the distal end side. The piezoelectric element 51 is connected to the transmission rod 90 through the electrode 52 and the press plate 54 on the distal end side.

FIG. 3 is a perspective exploded view of the element section 50. As shown in the drawing, the piezoelectric element 51 and the electrodes 52 are disc-shaped plate members with the axis CL as a center. The press plates 54 and the insulation plate 55 are disc-shaped plate members with axis CL as a center. Although the piezoelectric element 51 is formed by using crystals in the present embodiment, a piezoelectric element made of other materials may be adopted. On the piezoelectric element 51, an electric charge is generated in accordance with a load transmitted from the diaphragm 40 (FIG. 2) through the transmission rod 90. The piezoelectric element 51 outputs the electric charge (for example, an electric signal) in accordance with the load through the two electrodes 52. Based on the output electric signal, the deformation amount of the diaphragm 40, that is, the pressure inside the combustion chamber can be measured. In this way, the piezoelectric element 51 has electrical characteristics which vary in accordance with a pressure received on the diaphragm 40. Although, in the present embodiment, the electrodes 52 and the press plates 54 are formed by using stainless steel, they may be formed by using other metals. The insulation plate 55 is a member for insulation between the lead part 53 and the press screw 32 (FIG. 2). Although, in the present embodiment, the insulation plate 55 is formed of alumina, it may be formed of other kinds of insulation materials.

The lead part 53 is provided with a disc part 57 that is a substantially disc-shaped plate member and a terminal part 56 extending from the middle part of the disc part 57 toward the rear end direction Dr. The terminal part 56 projects to the rear end direction Dr side passing through a through-hole 54h of the press plate 54 and a through-hole 55h of the insulation plate 55 (FIG. 2). Although, in the present embodiment, the lead part 53 is formed by using stainless steel, it may be formed by using other metals. The lead part 53 can be formed by, after a shape formed by combining the disc part 57 and the terminal part 56 is punched out from a flat plate made of stainless steel, bending a part that becomes the terminal part 56.

In the inside of the shaft hole 81 of the second metal fitting 80 (FIG. 2), the lead part 53 is disposed such that the disc part 57 comes in surface contact with the electrode 52 and the terminal part 56 extends toward the rear end side. The terminal part 56 passes through the through-hole 54h formed in the middle part of the press plate 54 and the through-hole 55h formed in the middle part of the insulation plate 55. A part on the rear end side of the terminal part 56 is disposed inside the shaft hole 36 in a state of being separated from the inner wall surface of the shaft hole 36 of the press screw 32.

In the inside of the shaft hole 81 of the second metal fitting 80, each member (except the insulation plate 55) forming the element section 50 is disposed so as to be separated from the inner wall surface of the second metal fitting 80. The electrode 52 on the rear end side of the piezoelectric element 51 is electrically connected to the lead part 53 (in the present embodiment, further connected to the press plate 54), and is electrically separated from the first metal fitting 20, the second metal fitting 80 and the third metal fitting 35. The electrode 52 on the distal end side of the piezoelectric element 51 is electrically connected to the third metal fitting 35 through the press plate 54 on the distal end side, the transmission rod 90 and the diaphragm 40. In addition, in the present invention, the press plate 54 is disposed not only on the rear end side but also on the distal end side of the piezoelectric element 51 to equalize the distribution of a load applied to the piezoelectric element 51.

The cable 60 is disposed inside the shaft hole 21 of the first metal fitting 20. The cable 60 is a member to transmit the electric charge of the piezoelectric element 51 to an electric circuit, which is not shown in the drawings, for detecting the combustion pressure of the internal combustion engine based on the electric charge of the piezoelectric element 51. In the present embodiment, as the cable 60, a so-called shield wire having multilayer structure is used to reduce noise. The cable 60 is provided with an internal conductor 65, an insulator 64, a conductive coating 63, an external conductor 62 and a jacket 61 which are arranged from the center toward the outer circumferential side. The internal conductor 65 is formed of a plurality of conducting wires. The outer side in the radial direction of the internal conductor 65 is surrounded by the insulator 64. The outer circumferential surface of the insulator 64 is provided with the conductive coating 63. The outer side in the radial direction of the conductive coating 63 is provided with the external conductor 62 that is a mesh shield. The outer circumferential surface of the external conductor 62 is covered with the jacket 61. In this way, the cable including a plurality of members which are coaxially disposed is also referred to as a coaxial cable.

As shown in FIG. 2, at the distal end portion of the cable 60, the external conductor 62 which is not covered with the jacket 61 is exposed from a part which is covered with the jacket 61 toward the distal end side. In addition, the insulator 64 which is not covered with the external conductor 62 is exposed from a part, at which the external conductor 62 is exposed, toward the distal end side. Moreover, the internal conductor 65 which is not covered with the insulator 64 is exposed from a part, at which the insulator 64 is exposed, toward the distal end side.

The internal conductor 65 which is exposed at the distal end portion of the cable 60 is connected to the terminal part 56 of the element section 50 through a flat plate conducting wire 75 and a small diameter conducting wire 74. Specifically, the distal end of the internal conductor 65 is welded with the flat plate conducting wire 75, and the distal end of the flat plate conducting wire 75 is welded with the rear end of the small diameter conducting wire 74 which is wound in a coil shape, and the distal end of the small diameter conducting wire 74 is welded to the rear end portion of the terminal part 56. The flat plate conducting wire 75 and the small diameter conducting wire 74 are capable of transmitting the electric charge of the piezoelectric element 51 from the terminal part 56 to the internal conductor 65. As a configuration to connect the internal conductor 65 with the terminal part 56, another arbitrary configuration can be adopted instead of the configuration in which the flat plate conducting wire 75 and the small diameter conducting wire 74 are used.

A heat-shrinkable tube 72 covers a range from the distal end of the terminal part 56 to the position on the rear end side from the welded part at which the terminal part 56 and the small diameter conducting wire 74 are connected to each other and the whole of the terminal part 56 including the distal end portion of the small diameter conducting wire 74. With this, the reliability of the electrical insulation between the terminal part 56 and the press screw 32 is enhanced. When the pressure sensor 10 is manufactured, it is preferable that the integration of the lead part 53 having the terminal part 56 and the small diameter conducting wire 74 by welding and the coating with the heat-shrinkable tube 72 are performed before the assembly of the whole of the pressure sensor 10.

The distal end portion of the external conductor 62 is connected with a ground conductor 76 extending to the distal end side from the distal end of the external conductor 62. The ground conductor 76 is formed by a stranded wire continuously formed from the external conductor 62. The distal end portion of the ground conductor 76 is welded to the rear end portion of the press screw 32. With this, the external conductor 62 is grounded through the ground conductor 76, the press screw 32, the second metal fitting 80, the third metal fitting 35 and the cylinder head of the internal combustion engine.

In addition, molten rubber is injected into the shaft hole 21 of the first metal fitting 20, and the inside of the shaft hole 21 is filled with a rubber layer (not shown in the drawings). By forming the rubber layer, the waterproof property of the inside of the pressure sensor 10 is improved, and a vibration isolation property is also improved. In addition, molten resin may be injected into the shaft hole 21 instead of the molten rubber.

A-2. Detail of Configuration in Vicinity of Diaphragm 40

Figure 4A:
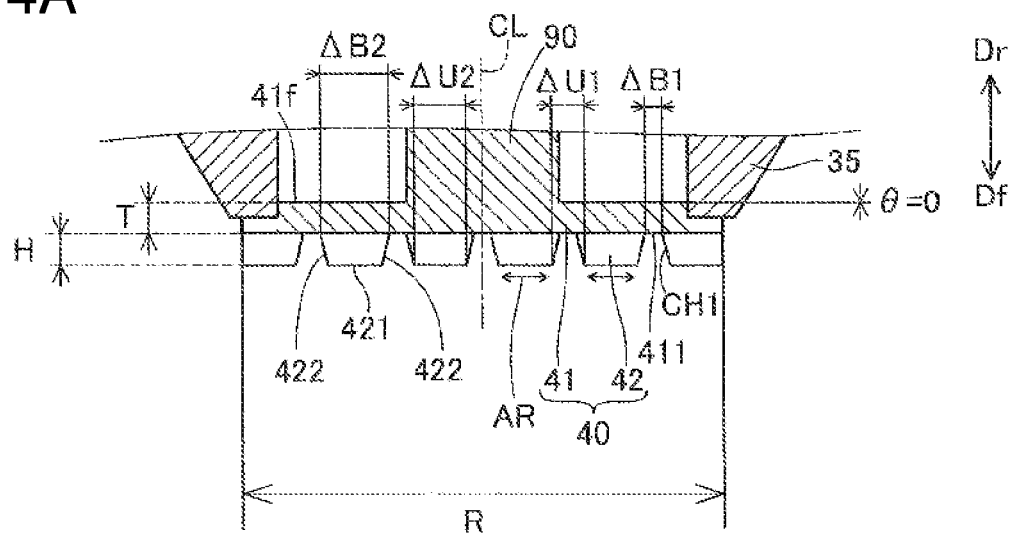
FIGS. 4A and 4B is are first explanatory views of a diaphragm 40.
Figure 4B:
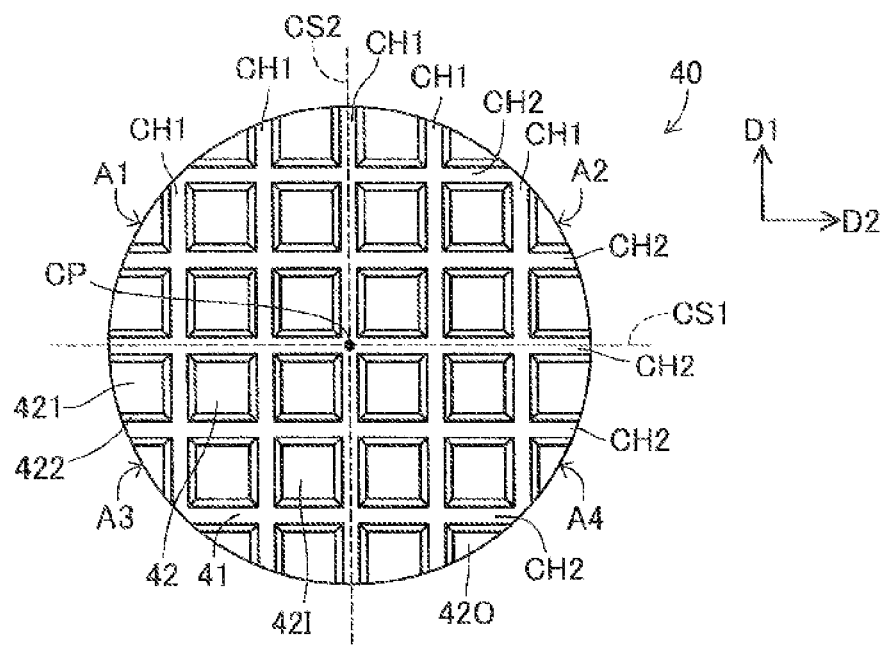

FIGS. 4A and 4B are first explanatory views of the diaphragm 40. In FIG. 4A, the vicinity of the diaphragm 40 of the sectional view of FIG. 2 is enlarged and shown. FIG. 4B is a drawing when the diaphragm 40 is viewed from the distal end side toward the rear end direction Dr along the axis CL. In FIG. 4B, members (for example, the third metal fitting 35) other than the diaphragm 40 are not shown in the drawings. In directions intersecting the axial direction, a vertical direction of FIG. 4B is set as a first direction D1, and a direction orthogonal to the first direction D1 (right and left direction of (FIG. 4B) is set as a second direction D2.

The diaphragm 40 expands in the direction intersecting the axis CL of the casing, and is deformed in accordance with the pressure received on the distal end side thereof. The diaphragm 40 has a substantially disc shape. The diaphragm 40 is provided with a base part 41 on the rear end side and a plurality of protruding parts 42 that protrude from a surface 411 on the distal end side of the base part 41 to the distal end side.

The base part 41 has a circular thin plate shape when viewed along the axial direction. T is the thickness (length in the axial direction) of the base part 41, and it is, for example, 0.1-5.0 mm, and R is the diameter (length in the redial direction) of the base part 41, and it is, for example, 2.7-14.0 mm. Here, in a cross section (FIG. 4A) including the axis CL, an acute angle θ formed between a surface 41f on the rear end side of the base part 41 and the direction perpendicular to the axis CL is 0. The angle θ is also referred to as the installing angle of the diaphragm 40.

The plurality of the protruding parts 42 are separated from each other by a plurality of grooves CH1 and CH2 formed on the distal end side of the diaphragm 40. The plurality of the grooves CH1 and CH2 are arranged in a lattice shape. A plurality of grooves include n (n is an integer of 2 or more, and in the example of FIGS. 4A and 4B, n=5) first grooves CH1 and n second grooves CH2 intersecting the first grooves CH1. The n first grooves extend in the first direction D1, and are arranged parallel to each other and at equal intervals to each other. The n second grooves extend in the second direction D2, and are arranged parallel to each other and at equal intervals to each other. A width ΔU1 on the distal end side of each of the first grooves CH1 is longer than a width ΔB1 on the rear end side of each of the first grooves CH1 (FIG. 4A). Similar to this, a width ΔU1 on the distal end side of each of the second grooves CH2 is longer than a width ΔB1 on the rear end side of each of the second grooves CH2 (not shown in the drawings).

Each of the protruding parts 42 is provided with a surface 421 (hereinafter, referred to as a protruding distal end surface) on the distal end side and a side surface 422 intersecting the protruding distal end surface 421. The protruding distal end surfaces 421, the side surfaces 422 and parts forming the bottoms of the grooves CH1 and CH2 in the surface 411 on the distal end side of the base part 41 are exposed to the distal end side. These parts which are exposed to the distal end side are pressure receiving surfaces which receive the pressure inside the combustion chamber at the time of use, and are also heat receiving surfaces which receive the heat inside the combustion chamber at the time of use.

The shape of each of the protruding distal end surfaces 421 of sixteen protruding parts 42I (also referred to as middle protruding parts) in the plurality of the protruding parts 42, protruding parts 42I which are positioned in the vicinity of a gravity center CP of the base part 41, is a square. One middle protruding part 42I is separated from the other protruding parts by two first grooves CH1 and two second grooves CH2. The sixteen middle protruding parts 42I are arranged point symmetrically with respect to the gravity center CP. As mentioned above, since the width ΔU1 on the distal end side of the grooves CH1 and CH2 is longer than the width ΔB1 on the rear end side of the grooves CH1 and CH2, a width ΔU2 in each of the first direction D1 and the second direction D2 on the distal end side of each of the middle protruding parts 42I is shorter than a width ΔB2 in each of the first direction D1 and the second direction D2 on the rear end side of each of the middle protruding parts 42I.

Sixteen protruding parts 42O (also referred to as outer edge protruding parts) in the plurality of the protruding parts 42, protruding parts 42O which are disposed along the outer edge of the diaphragm 40, have shapes in which the above-mentioned middle protruding parts 42I are cut in arcs.

A height H (height in the axial direction) of each of the plurality of the protruding parts 42 (the middle protruding parts 42I and the outer edge protruding parts 42O) is, for example, 0.005-12.5 mm. The height H of each of the plurality of the protruding parts 42 can be also referred to as a depth H of each of the plurality of the grooves CH1 and CH2. In the present embodiment, the height H of the protruding parts 42 and the thickness T of the base part 41 satisfy the relationship $0.05T \leq H \leq 2.5T$.

FIGS. 5A and 5B are second explanatory views of the diaphragm 40. In FIG. 5A, a perspective view of the distal end parts of the diaphragm 40 and the third metal fitting 35 is shown. The total area of the plurality of the protruding distal end surfaces 421 is defined as S2. The area S2 is areas of hatched parts in FIG. 5A.

FIG. 5B is a perspective view of the distal end parts of the diaphragm 40 and the third metal fitting 35, when assuming that there is no plurality of the protruding parts 42. When assuming that there is no plurality of the protruding parts 42, the diaphragm 40 is formed of only the base part 41. The area of a surface (hereinafter, also referred to as a base distal end surface) 41S on the distal end side of the base part 41 when assuming that there is no plurality of the protruding parts 42 is defined as S1. The area S1 is the area of a hatched part in FIG. 5B.

In the present embodiment, the total area S2 of the protruding distal end surfaces 421 and the area S1 of the base distal end surface 41S satisfy the relationship $0.05 \leq (S2/S1) \leq 0.8$.

Here, two virtual planes CS1 and CS2 which pass through the gravity center CP (FIG. 4B) of the base distal end surface 41S, include the axis CL, are perpendicular to each other, and which divide the base distal end surface 41S into four areas A1 to A4 are defined as a pair of the virtual planes CS1 and CS2. In FIG. 4B, the pair of the virtual planes CS1 and CS2 is drawn by broken line.

One or more protruding parts 42 are positioned in each of the four areas A1 to A4 which are divided by the pair of the virtual planes CS1 and CS2. In an example of FIG. 4B, four middle protruding parts 42I and four outer edge protruding parts 42O are positioned in each of the four areas A1 to A4.

A-4. Operation of Pressure Sensor 10

The pressure receiving surface (the protruding distal end surfaces 421, the side surfaces 422 and the bottom surfaces of the grooves CH1 and CH2) on the distal end side of the diaphragm 40 receive a pressure Pc of the inside of the combustion chamber (FIG. 2). The diaphragm 40 is deformed in accordance with the pressure Pc received on the pressure receiving surface, that is, deformed in accordance with the pressure Pc inside the combustion chamber. For example, the diaphragm 40 is deflected in the axial direction. The transmission rod 90 is displaced substantially parallel to the axis CL in accordance with the deformation of the diaphragm 40. With this, the transmission rod 90 transmits a load in accordance with the pressure Pc to the element section 50. The piezoelectric element 51 of the element section 50 outputs an electric signal according to the load transmitted through the transmission rod 90, through the two electrodes 52. Based on the output electric signal, the pressure Pc inside the combustion chamber is detected.

Here, the pressure receiving surface on the distal end side of the diaphragm 40 is also a heat receiving surface which receives the heat of the inside of the combustion chamber. There is therefore possibility that the diaphragm 40 is deformed by not only the pressure Pc inside the combustion chamber but also the heat inside the combustion chamber. According to the present embodiment, three or more protruding parts 42 are provided on the distal end side of the base part 41 of the diaphragm 40. In addition, the height H of the protruding parts 41 and the thickness T of the above-mentioned base part 41 satisfy the relationship $0.05T \leq H \leq 2.5T$, and the total area S2 of the protruding distal end surfaces 421 and the area S1 of the base distal end surface 41S satisfy the relationship $0.05 \leq (S2/S1) \leq 0.8$. Consequently, the deformation of the diaphragm 40 caused by the heat is suppressed. As this result, it is possible to improve the measuring accuracy of the pressure Pc by the pressure sensor 10.

Figure 6:
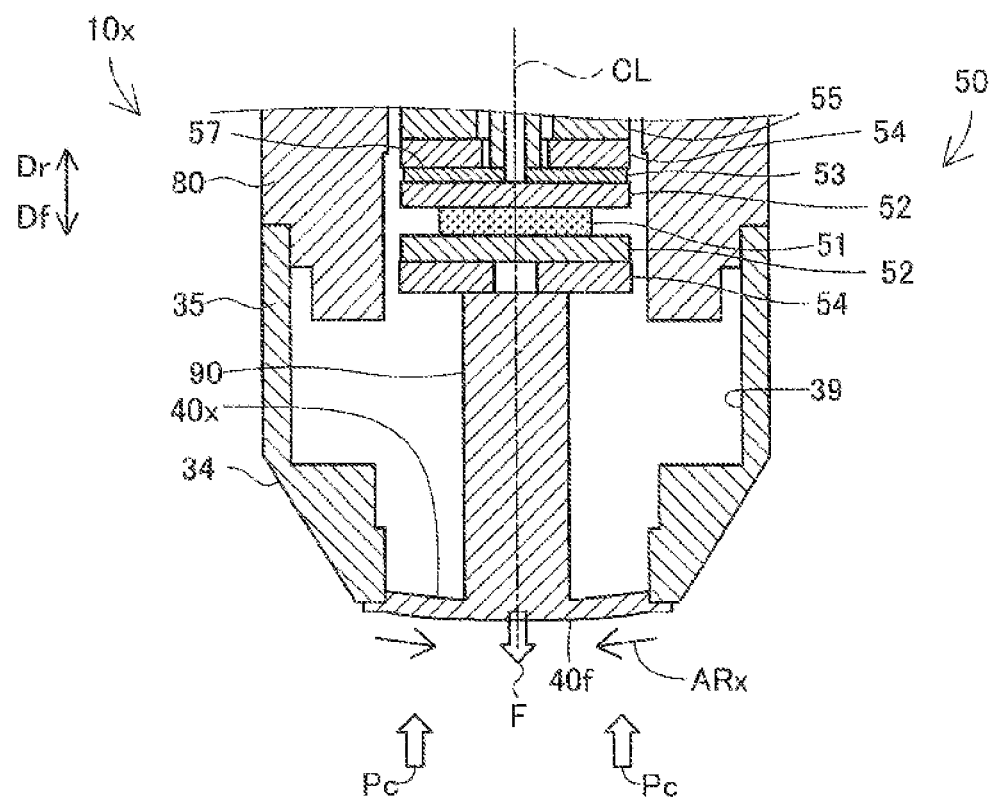
FIG. 6 is an explanatory view of operation of a pressure sensor 10x in a reference embodiment.

FIG. 6 is an explanatory view of operation of a pressure sensor 10x in a reference embodiment. In the drawing, a plane cross section of a part on the distal end side of the pressure sensor 10x including the axis CL is shown. The difference from the pressure sensor 10 of the embodiment in FIG. 2 and FIGS. 4A and 4B is only that the protruding parts 42 are not provided on the distal end side of a diaphragm 40x. The configurations of the other parts of the pressure sensor 10x are the same as those of the corresponding parts of the pressure sensor 10 of the embodiment.

A pressure receiving surface 40f of the diaphragm 40x receives the pressure Pc inside the combustion chamber. In addition, the pressure receiving surface 40f of the diaphragm 40x receives the heat inside the combustion chamber. Consequently, there is possibility that a part on the distal end direction Df side of the diaphragm 40x locally thermally expands. The outer circumferential edge of the diaphragm 40x is joined to the third metal fitting 35. As shown by an arrow ARx in FIG. 6, the diaphragm 40x therefore extends toward the inner circumferential side (axis CL side) by the thermal expansion. As this result, by the thermal expansion of the diaphragm 40x, a force parallel to the axis CL is applied to the transmission rod 90. For example, in an example of FIG. 6, by the thermal expansion of the pressure receiving surface 40f of the diaphragm 40x, a force F in the distal end direction Df is applied to the transmission rod 90. With this, a load applied to the element section 50 becomes small. Consequently, in the pressure sensor 10x of the reference embodiment, since there is possibility that the load applied to the element section 50 largely varies in dependence on a temperature of combustion gas, an error of the signal from the element section 50 becomes large. There is therefore possibility that the measuring accuracy of the pressure Pc by the pressure sensor 10x becomes low.

In contrast to this, in the present embodiment, the plurality of the protruding parts 42 of the diaphragm 40 mainly receive the heat inside the combustion chamber. As shown by an arrow AR in FIGS. 4A and 4B, the plurality of the protruding parts 42 thermally expand. However, since the plurality of the protruding parts 42 are separated from each other, even if each of the plurality of the protruding parts 42 expands, the thermal expansion of the individual protruding parts 42 is not transmitted to other protruding parts 42. In addition, since the plurality of the protruding parts 42 absorb the heat, the transmission of the heat to the base part 41 can be suppressed. Consequently, the deformation of the base part 41 caused by the heat can be suppressed. The deformation of the diaphragm 40 caused by the heat is therefore suppressed, and the measuring accuracy of the pressure Pc by the pressure sensor 10 can be improved.

However, in case where the height H of the protruding parts 42 is extremely smaller than the thickness T of the base part 41, the plurality of the protruding parts 42 cannot sufficiently absorb the heat. Consequently, there is possibility that the deformation of the base part 41 occurs caused by the transmission of the heat to the base part 41 and the measuring accuracy of the pressure sensor 10 cannot be improved sufficiently. In addition, in case where the height H of the protruding parts 42 is extremely larger than the thickness T of the base part 41, there is possibility that by the damage caused by the lack in strength of the base part 41, the measuring accuracy of the pressure sensor 10 cannot be sufficiently improved.

In addition, in case where the total area S2 of the protruding distal end surfaces 421 is extremely smaller than the area S1 of the base distal end surface 41S, the plurality of the protruding parts 42 cannot sufficiently absorb the heat. Consequently, there is possibility that the deformation of the base part 41 occurs caused by the transmission of the heat to the base part 41 and the measuring accuracy of the pressure sensor 10 cannot be sufficiently improved. In case where the total area S2 of the protruding distal end surfaces 421 is extremely larger than the area S1 of the base distal end surface 41S, the grooves CH1 and CH2 each having an appropriate width are not formed, and the plurality of the protruding parts 42 are not appropriately separated from each other, and the thermal expansion of the individual protruding parts 42 is transmitted to other protruding parts 42. As this result, there is possibility that the measuring accuracy of the pressure sensor 10 cannot be sufficiently improved.

As can be understood from the above explanation, in the pressure sensor 10, in case where the diaphragm 40 is provided with three or more protruding parts 42, and the relationships $0.05T \leq H \leq 2.5T$ and $0.05 \leq (S2/S1) \leq 0.8$ are satisfied, the deformation of the diaphragm 40 caused by the heat is suppressed, and the measuring accuracy of the pressure Pc by the pressure sensor 10 can be improved.

Moreover, in the present embodiment, at least a pair of the virtual planes CS1 and CS2 which divides the base distal end surface 41S exists such that one or more protruding parts 42 are positioned in each of the four areas A1 to A4 (FIG. 4B). In this way, by arranging the protruding parts 42 on the base part 41 of the diaphragm 40 so as to be distributed, the deformation of the diaphragm 40 caused by the heat can be effectively suppressed. Consequently, the measuring accuracy of the pressure Pc by the pressure sensor 10 can be further improved.

Moreover, as shown in FIG. 4B, the plurality of the protruding parts 42 are formed so as to be in plane symmetry to the virtual plane surfaces CS1 and CS2. In addition, as shown in FIG. 4B, the plurality of the protruding parts 42 are formed so as to be in point symmetry to the gravity center CP. In this way, since the plurality of the protruding parts 42 are arranged to be dispersed so as to be high in symmetry, the deformation of the diaphragm 40 caused by the heat can be suppressed more effectively, and it is also possible to suppress that the diaphragm 40 is locally distorted and deformed.

Furthermore, in the present embodiment, as mentioned above, the diaphragm 40 has the plurality of the grooves CH1 and CH2 having the depth H which extend along the surface on the distal end side thereof, and the plurality of the protruding parts 42 are set apart from each other by these grooves CH1 and CH2. With this, the protruding parts 42 can be formed in a structure which is capable of effectively suppressing the deformation of the diaphragm 40 caused by the heat and which is easily manufactured. For example, by simply forming the plurality of the grooves CH1 and CH2 on a metal disc-shaped member with a cutting method, the diaphragm 40 provided with the plurality of the protruding parts 42 can be easily manufactured.

Furthermore, the plurality of the grooves CH1 and CH2 respectively include a plurality of first grooves CH1 arranged parallel to each other and a plurality of second grooves CH2 which are arranged parallel to each other and which intersect the first grooves CH1. With this, it is possible to form the protruding parts 42 having a structure which is capable of suppressing the deformation of the diaphragm 40 caused by the heat more effectively and which can be easily manufactured.

Furthermore, in the present embodiment, the plurality of the protruding parts 42 include the middle protruding parts 42I of which the shapes of the protruding distal end surfaces 421 are polygons. More specifically, the middle protruding parts 42I are set apart from other protruding parts by two first grooves CH1 and two second grooves CH2, and the shapes of the protruding distal end surfaces 421 are squares. The middle protruding parts 42I including the surfaces 421 having such shapes have an advantage of being easily formed by forming the linear grooves CH1 and CH2 onto a metal disc-shaped member.

Furthermore, in the present embodiment, a plurality of grooves including the first grooves CH1 and the second grooves CH2 are arranged in a lattice shape. As this result, the plurality of the protruding parts 42 which are arranged to be dispersed can be easily formed on the distal end side of the diaphragm 40. It is therefore possible to form the protruding parts 42 having a structure which is capable of suppressing the deformation of the diaphragm 40 caused by the heat more effectively and which is easily manufactured.

Here, since the distal end side of the protruding parts 42 is close to the center of a high temperature part of the combustion chamber, the temperature thereof becomes higher than that on the rear end side of the protruding parts 42. Consequently, the thermal expansion amount on the distal end side of the protruding parts 42 becomes larger than that on the rear end side of the protruding parts 42. In the present embodiment, the width ΔU1 on the distal end side of the grooves CH1 and CH2 is therefore set longer than the width ΔB1 on the rear end side. With this, when the plurality of the protruding parts 42 thermally expand, it is possible to suppress the plurality of the protruding parts 42 from interfering with each other.

A-4. Evaluation Simulation

The diaphragm 40 of the pressure sensor 10 in the first embodiment was evaluated by the simulation of 56 kinds of samples in which the height H of the protruding parts 42 to the thickness T of the base part 41 and the total area S2 of the protruding distal end surfaces 421 to the area S1 of the base distal end surface 41S were different from each other. This simulation was performed by using ANSYS that is FEM (finite element method) analysis software of ANSYS Japan K.K.

In the 56 kinds of the samples, the thickness T of the base part 41 was fixed, and the height H of the protruding parts 42 was changed, and the height H of the protruding pars 42 was set to any of 0, 0.05T, 0.1T, 0.25T, 0.5T, 1T, 2.5T and 3T. In addition, the dimension of the base end part 41 and the numbers of the groves CH1 and CH2 were fixed, and the width ΔU1 and the width ΔB1 (FIGS. 4A and 4B) of the grooves CH1 and CH2 were changed, and the value (S2/S1) was set to any of 0, 0.05, 0.2, 0.4, 0.6, 0.8, and 1. As to all combinations (8×7 combinations), a total of 56 kinds of samples were made. In addition, when the value of (S2/S1) is 0 or 1, the protruding parts 42 are not formed. When the height H of the protruding parts 42 is 0, similarly, the protruding parts 42 are not formed.

TABLE 1

| | | Height H of protruding parts | | | | | | |
|---|---|---|---|---|---|---|---|---|
| | | 0 | 0.05 T | 0.1 T | 0.25 T | 0.5 T | 1 T | 2.5 T | 3 T |
| S2/S1 | 0 | B | B | B | B | B | B | B | B |
| | 0.05 | B | A | A | A | A | A | A | B |
| | 0.2 | B | A | A | A | A | A | A | B |
| | 0.4 | B | A | A | A | A | A | A | B |
| | 0.6 | B | A | A | A | A | A | A | B |
| | 0.8 | B | A | A | A | A | A | A | B |
| | 1 | B | B | B | B | B | B | B | B |

Dimension and material (material parameter on simulation) which are common in each of the samples are as follows.

Thickness T of base part 41: 0.2 mm
Outer diameter R of diaphragm 40: 10 mm
Material of diaphragm 40: stainless steel In the simulation, in each of the samples, a pressure P_L of each of the samples which was measured through the element section 50 at room temperature (25 degrees Celsius) and at the atmospheric pressure (one atmospheric pressure), and a pressure P_H of each of the samples which was measured through the element section 50 at a temperature (1000 degrees Celsius) corresponding to the temperature inside the combustion engine and at the atmospheric pressure (one atmospheric pressure) were calculated. Then, an error ΔP=(P_H−P_L) of a measurement pressure caused by the heat was calculated. Since the pressure P_L and the pressure P_H are values measured at the same pressure (one atmospheric pressure), it can be considered that the error ΔP is an error caused by the thermal expansion of the diaphragm 40.

Then, similarly, by calculating an error in each sample in which the protruding parts 42 were not formed, a reference error ΔPs was calculated. In addition, the evaluation of a sample in which the absolute value of the error ΔP is significantly smaller than that of the reference error ΔPs is judged as "A", and the evaluation of a sample in which the absolute value of the error ΔP is the same as that of the reference error ΔPs is judged as "B".

Evaluation result is shown in Table 1. The evaluation result of the samples in which (S2/S1) was 0 and 1 and all of the samples in which the height H of the protruding parts 42 was 0 were "B", because the protruding parts 42 were not formed in these samples. In addition, the evaluation of all of the samples in which the height H of the protruding parts 42 was 3T was also "B". This can be considered that the height H of the protruding parts 42 is excessively large.

On the other hand, the evaluation of all of the samples in which the relationships 0.05T≤H≤2.5T and 0.05≤(S2/S1) ≤0.8 were satisfied was "A". That is, in all of the samples in which the height H of the protruding parts 42 was any of 0.05T, 0.1T, 0.25T, 0.5T, 1T and 2.5T and (S2/S1) was any of 0.05, 0.2, 0.4, 0.6 and 0.8, the improvement of the measurement error caused by the thermal expansion was observed.

As the above result, in the pressure sensor 10, in case where the plurality of the protruding parts 42 of the diaphragm 40 satisfied the relationships 0.05T≤H≤2.5T and 0.05≤(S2/S1)≤0.8, the deformation of the diaphragm 40 caused by the heat was suppressed, and the measuring accuracy of the pressure Pc by the pressure sensor 10 was improved.

Figure 7A:
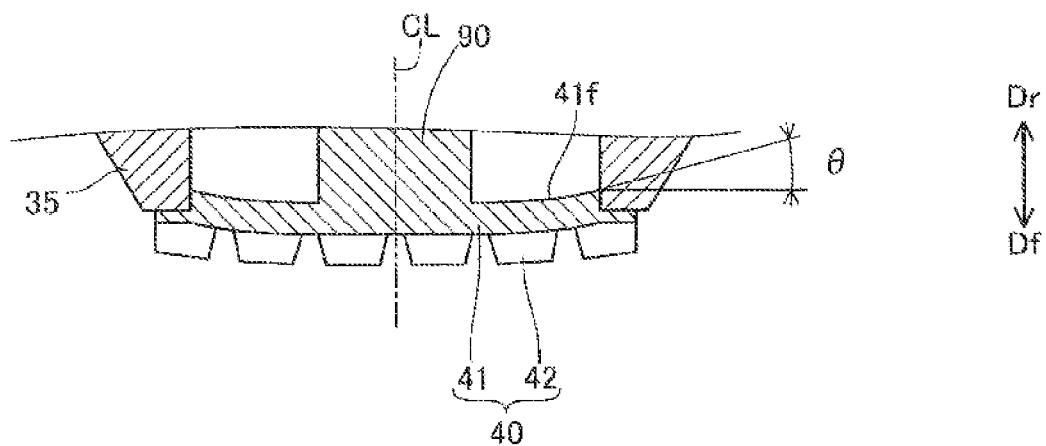
FIGS. 7A and 7B are explanatory views of a variation.
Figure 7B:
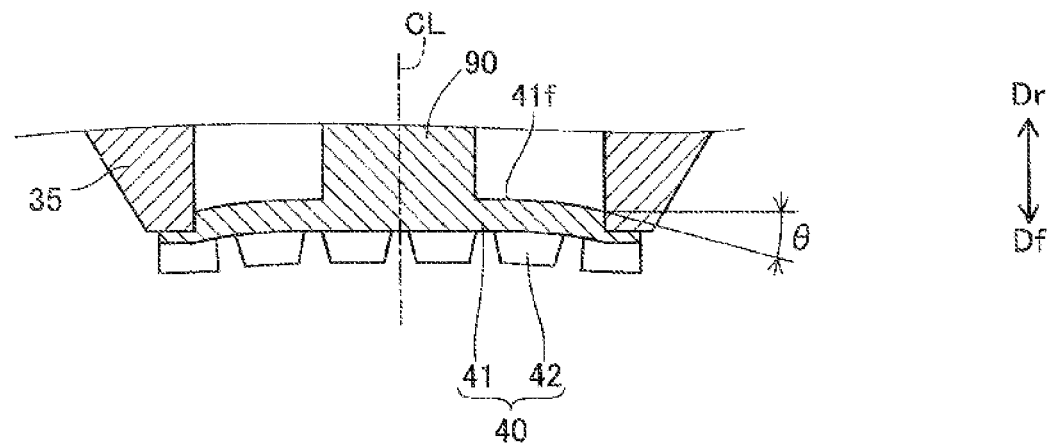

E. Variation:

(1) In the above embodiment, although the installing angle θ of the diaphragm 40, that is, the acute angle θ formed between the surface 41f on the rear end side of the base part 41 and the direction perpendicular to the axis CL is 0 degree, this angle θ is not limited to this. FIGS. 7A and 7B are explanatory views of a variation. As shown in FIG. 7A, in a section including the axis CL, the surface 41f on the rear end side of the base part 41 may be inclined to the rear end side gradually, as going toward the outside in the radial direction. In this case, it is preferable that the angle θ is 20 degrees or less. With this, the diaphragm 40 can be joined to the distal end of the third metal fitting 35 without causing trouble, and a problem in the measuring accuracy of the pressure also does not occur.

In addition, as shown in FIG. 7B, in a section including the axis CL, the surface 41f on the rear distal end side of the base part 41 can be inclined to the distal end side gradually, as going toward the outside in the radial direction. Also in this case, it is preferable that the angle θ is 20 degrees or less. With this, the diaphragm 40 can be joined to the distal end of the third metal fitting 35 without causing trouble, and a problem in the measuring accuracy of the pressure also does not occur.

(2) In the above embodiment, the shape of each of the protruding parts 42 formed on the diaphragm 40 is an example, and it is not limited to this. For example, in case where the diaphragm 40 is made of a heat resistant resin, since the protruding parts 42 can be formed by die molding, a degree of freedom in the shapes of the protruding parts 42 is high, and the protruding parts 42 can be formed in a variety of shapes. For example, the protruding distal end surfaces 421 of the protruding parts 42 can be formed in a variety of shapes including polygons, such as a rectangle, a triangle, a rhombus and a pentagon, a circle and an ellipse.

Figure 8A:
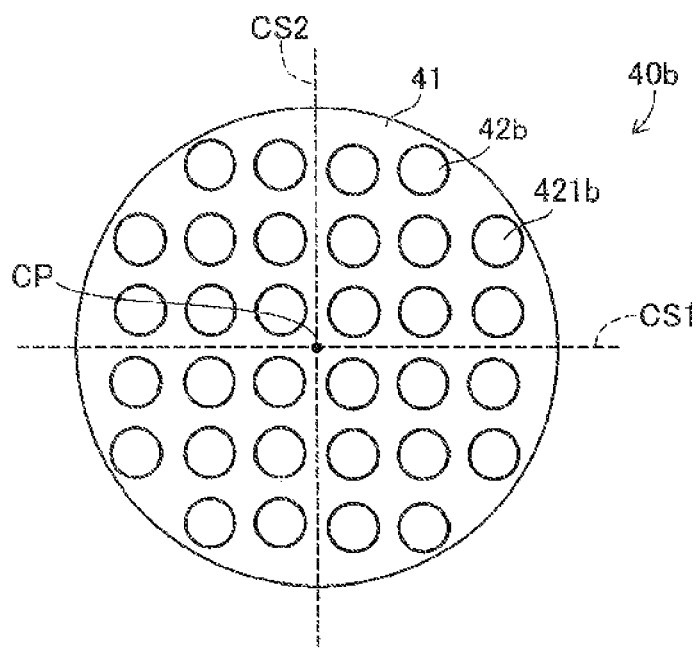
FIGS. 8A and 8B are drawings when a diaphragm of a variation is viewed along an axis CL.
Figure 8B:
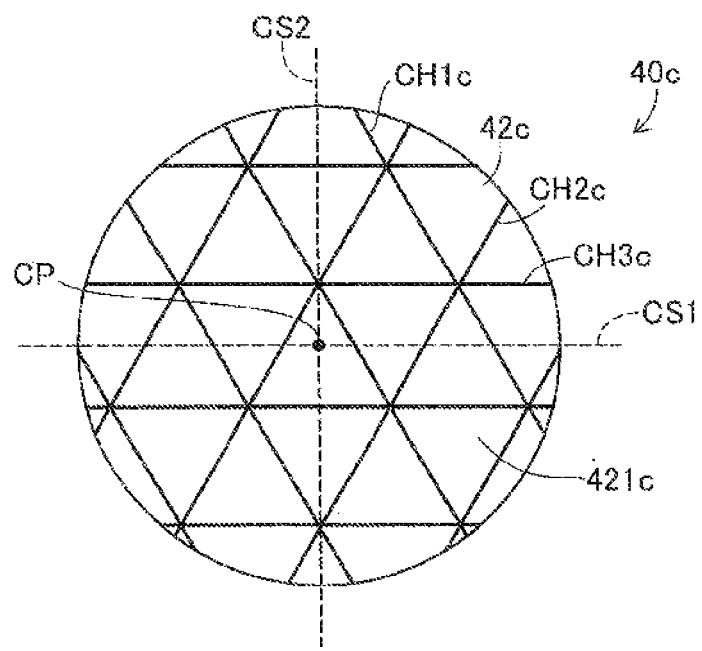

FIGS. 8A and 8B are drawings when a diaphragm in a variation is viewed from the distal end side toward the rear end direction Dr along the axis CL. Protruding parts 42*b* of a diaphragm 40*b* in FIG. 8A each have a substantially columnar shape. The shape of each protruding distal end surface 421*b* of the protruding parts 42*b* is therefore a circle.

The distal end side of a diaphragm 40*c* in FIG. 8B is formed with a plurality of grooves CH1*c*, CH2*c* and CH3*c*. Similar to the grooves CH1 and CH2 in FIG. 4B, each of these grooves CH1*c*, CH2*c* and CH3*a* has a predetermined width. However, in FIG. 8B, to avoid the drawing from being complicated, each of the grooves CH1*c*, CH2*c* and CH3*c* is shown by one line. In the diaphragm 40*c* in FIG. 8B, a plurality of the first grooves CH1*c* are arranged parallel to each other at equal intervals, and intersect the second grooves CH2*c* and the third grooves CH3*c*. A plurality of the second grooves CH2*c* are arranged parallel to each other at equal intervals, and intersect the first grooves CH1*c* and the third grooves CH3*c*. A plurality of the third grooves CH3*c* are arranged parallel to each other at equal intervals, and intersect the first grooves CH1*c* and the second grooves CH2*c*. The acute angles formed between the first grooves CH1*c* and the second grooves CH2*c*, the acute angles formed between the first grooves CH1*c* and the third grooves CH3*c* and the acute angles formed between the second grooves CH2*c* and the third grooves CH3*c* are each 60 degrees. As this result, the diaphragm 40*c* is formed with protruding parts 42*c* each having a triangular prism which are set apart from each other by these grooves CH1*c*, CH2*c* and CH3*c*. The shape of each of the protruding distal end surfaces 421*c* of the protruding parts 42*c* is therefore a triangle.

(3) The number of the protruding parts 42 in the present embodiment is an example, and it is not limited to this. The number of the protruding parts 42 may be an arbitrary number of three or more, and for example, it may be three, four, six or ten.

(4) As a configuration of a connection part which connects the diaphragm 40 with the piezoelectric element 51, it is not limited to the configuration of FIG. 2, and other various configurations can be adopted. For example, the diaphragm 40 may have a ring shape which is provided with, at a position intersecting the axis CL, a through-hole for inserting the transmission rod 90. Then, the outer circumferential surface of the transmission rod 90 may be joined with the inner circumferential edge of the diaphragm 40 by welding. In addition, it is possible that the press plate 54 of the element section 50, which is disposed on the distal end side, is omitted and the transmission rod 90 comes in contact with only the electrode 52 on the distal end side of the elements of the element section 50. Moreover, it is possible that the press plate 54 and the electrode 52 on the distal end side of the element section 50 are omitted and the piezoelectric element 51 is directory connected to the transmission rod 90.

(5) As a configuration of the element section 50, instead of the configuration of FIG. 2 and FIG. 3, other various configurations can be adopted. In general, it is preferable that the element section 50 includes a piezoelectric element, and is configured so as to output a signal from the piezoelectric element to the outside of a pressure sensor. In addition, as a sensor which outputs an electric signal in accordance with the deformation of a diaphragm, instead of the piezoelectric element, various devices can be adopted which have electrical characteristics (for example, voltage, resistance value, etc.) which are changed according to the deformation of the diaphragm. For example, a strain gauge can be adopted.

(6) In the above embodiment (for example, FIG. 2), the diaphragm 40 is joined to the cylindrical casing formed of the second metal fitting 80 and the third metal fitting 35, and the element section 50 is accommodated inside the casing. As a configuration of the casing, instead of the configuration in which the second metal fitting 80 and the third metal fitting 35 are used, various configurations having cylindrical shapes can be adopted. For example, the whole of the second metal fitting 80 and the third metal fitting 35 can be formed by one member. In addition, the whole of the second metal fitting 80 and the press screw 32 can be formed by one member. Moreover, the second metal fitting 80, the third metal fitting 35 and the press screw 32 can be formed by one member.

(7) As a configuration to lead the signal from the element section 50 to the outside of the pressure sensor, instead of the configuration in which the cable 60 is used, other various configurations can be adopted. For example, it is possible that a terminal metal fitting is disposed on the rear end side of the pressure sensor 10 and the terminal metal fitting and the terminal part 56 of the element section 50 are connected to each other by an inner shaft. In this case, it is possible to receive the signal from the element section 50 through the terminal metal fitting and the first metal fitting 20.

As the above, although the present invention has been explained based on the embodiment and the variation, the mode for implementing the invention mentioned above is one for facilitating understanding of the present invention, and the present invention is not limited to this. The present invention can be modified and improved without deviating from its objects and the scope of the claims, and the present invention includes its equivalents.

EXPLANATION OF REFERENCE SINGS

10: Pressure sensor
20: First metal fitting
21: Shaft hole
22: Screw part
24: Tool engaging part
34: Enlarged diameter portion
35: Third metal fitting
36, 39: Shaft hole
40, 40*b*, 40*c*: Diaphragm
41: Base part
41S: Base distal end surface
42, 42*b*, 42*c*: Protruding part
42I: Middle protruding part
42O: Outer edge protruding part
50: Element section
51: Piezoelectric element
52: Electrode
53: Lead part
54: Press plate
54*h*: Through hole
55: Insulation plate
55*h*: Through hole
56: Terminal part
57: Disc part
60: Cable
61: Jacket 62: External conductor
63: Conductive coating
64: Insulator
65: Internal conductor
72: Heat-shrinkable tube
74: Small diameter conducting wire
75: Flat plate conducting wire
76: Ground conductor
80: Second metal fitting
81: Shaft hole
90: Transmission rod
99: Rear end portion
421, 421*b*, 421*c*: Protruding distal end surface
422: Side surface
CH1, CH1*c*: First groove
CH2, CH2*c*: Second groove
CH3*c*: Third groove
U2: Width Δ
B2: Width Δ
S2: Area
CS1, CS2: Virtual plane

The invention claimed is:

1. A pressure sensor comprising:
a cylindrical casing extending in an axial direction;
a diaphragm which is joined to a distal end side of the casing, expands in a direction that intersects an axis of the casing, and which is deformed in accordance with a pressure received on the distal end side; and
a sensor section which is disposed inside the casing and which outputs an electric signal that corresponds to the deformation of the diaphragm,
wherein the diaphragm includes a plate-shaped base part and three or more protruding parts which protrude from a surface on the distal end side of the base part toward the distal end side and which are set apart from each other, and
wherein relationships $0.05T \leq H \leq 2.5T$ and $0.05 \leq (S2/S1) \leq 0.8$ are satisfied, when T is a thickness of the base part, H is a length in the axial direction of the protruding parts, S1 is an area of a base distal end surface that would be the surface on the distal end side of the base part if the protruding parts were not present, and S2 is a total area of protruding distal end surfaces that are surfaces on the distal end side of the three or more protruding parts.

2. The pressure sensor according to claim 1, wherein four or more of the protruding parts are provided, and
wherein when two virtual planes are defined as a pair of the virtual planes, the two virtual planes which include the axis, pass through a gravity center of the base distal end surface, are perpendicular to each other, and which divide the base distal end surface into four areas, at least one pair of the virtual planes which divides the base distal end surface such that one or more of the protruding parts are positioned in each of the four areas are present.

3. The pressure sensor according to claim 1, wherein the three or more protruding parts include a protruding part of which a corresponding one of the protruding distal end surfaces has a polygonal shape.

4. The pressure sensor according to claim 1, wherein the diaphragm includes a plurality of grooves each having a depth H, which extend along the surface on the distal end side, and
wherein the three or more protruding parts are set apart from each other by the grooves.

5. The pressure sensor according to claim 4, wherein the plurality of the grooves include a plurality of first grooves arranged parallel to each other and a plurality of second grooves arranged parallel to each other and intersecting the first grooves.

6. The pressure sensor according to claim 5, wherein the three or more protruding parts are separated from other protruding parts by two of the first grooves and two of the second grooves, and include a protruding part of which a corresponding one of the protruding distal end surfaces has a square shape.

7. The pressure sensor according to claim 6, wherein the plurality of the grooves including the first grooves and the second grooves are arranged in a lattice shape.

8. The pressure sensor according to claim 1, wherein in a cross section including the axis, an acute angle θ formed between a surface on a rear end side of the base part and a direction perpendicular to the axis is 20 degrees or less.

* * * * *